US009150268B2

(12) United States Patent
Inoue et al.

(10) Patent No.: US 9,150,268 B2
(45) Date of Patent: Oct. 6, 2015

(54) FUEL TANK AND PUMP ASSEMBLY, AND MOTORCYCLE INCLUDING SAME

(71) Applicant: HONDA MOTOR CO., LTD., Minato-ku, Tokyo (JP)

(72) Inventors: Yusuke Inoue, Wako (JP); Kohei Hirano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/496,021

(22) Filed: Sep. 25, 2014

(65) Prior Publication Data
US 2015/0090512 A1 Apr. 2, 2015

(30) Foreign Application Priority Data

Sep. 30, 2013 (JP) ................................. 2013-205211

(51) Int. Cl.
*B62J 35/00* (2006.01)
*B62K 11/00* (2006.01)
*F02M 37/10* (2006.01)

(52) U.S. Cl.
CPC ................ *B62J 35/00* (2013.01); *B62K 11/00* (2013.01); *F02M 37/103* (2013.01); *Y10T 137/86067* (2015.04)

(58) Field of Classification Search
CPC ........... B62J 35/00; B62J 37/00; F02M 37/10
USPC ......................................................... 280/835
See application file for complete search history.

(56) References Cited

U.S. PATENT DOCUMENTS

| 6,182,640 | B1 * | 2/2001 | Nakashima et al. | ........... 123/516 |
|---|---|---|---|---|
| 6,253,790 | B1 * | 7/2001 | Hara | ......................... 137/565.17 |
| 6,401,750 | B2 * | 6/2002 | Tokunaga | ................ 137/565.34 |
| 6,679,292 | B2 * | 1/2004 | Ootaka et al. | ............. 137/565.17 |
| 7,401,597 | B2 * | 7/2008 | Koike et al. | .................... 123/509 |
| 7,451,745 | B2 * | 11/2008 | Okazaki et al. | ................ 123/509 |
| 7,484,766 | B2 * | 2/2009 | Iwasaki | ......................... 280/833 |
| 7,533,904 | B2 * | 5/2009 | Koike et al. | .................... 280/834 |
| 7,681,920 | B2 * | 3/2010 | Iwasaki | ......................... 280/831 |
| 7,992,901 | B2 * | 8/2011 | Hirano et al. | ................. 280/833 |
| 7,997,622 | B2 * | 8/2011 | Yamada | ......................... 280/835 |
| 8,196,989 | B2 * | 6/2012 | Yokoyama et al. | ............. 296/66 |
| 8,286,744 | B2 | 10/2012 | Mizukura et al. | |
| 8,292,115 | B2 * | 10/2012 | Kobayashi et al. | ........... 220/562 |
| 2007/0235089 | A1 * | 10/2007 | Koike | ....................... 137/565.17 |
| 2013/0105234 | A1 * | 5/2013 | Nishimura et al. | ........... 180/69.4 |

FOREIGN PATENT DOCUMENTS

JP 5235089 B2 7/2013

* cited by examiner

*Primary Examiner* — Anne Marie Boehler
*Assistant Examiner* — Michael Stabley
(74) *Attorney, Agent, or Firm* — Carrier Blackman & Associates, P.C.; William D. Blackman; Joseph P. Carrier (57) ABSTRACT

A fuel tank and pump assembly is provided for supporting a fuel pump on a fuel tank, with a pump support member provided on a tank outer wall of the fuel tank. The fuel pump includes a pumping portion which is inserted into the fuel tank through a pump attachment opening formed a main tank body of the fuel tank. The pump support member includes a plurality of arcuate support plate elements arranged around the pump attachment opening. The fuel pump is secured to fastening sections provided on the support plate elements, and is attached to a main tank body at the pump attachment opening in a sealed, liquid tight manner.

14 Claims, 9 Drawing Sheets

FUEL TANK AND PUMP ASSEMBLY, AND MOTORCYCLE INCLUDING SAME

CROSS-REFERENCE TO RELATED APPLICATIONS

The present invention claims priority under 35 USC 119 based on Japanese patent application No. 2013-205211, filed on Sep. 30, 2013. The entire subject matter of this priority document, including specification claims and drawings, is incorporated by reference herein.

BACKGROUND OF THE INVENTION

1. Technical Field of the Invention

The present invention relates to a fuel tank and pump assembly and, more particularly, to a fuel tank and pump assembly in which the fuel tank is provided with an improved support member adapted to support the fuel pump in the fuel tank. In addition, the present invention also relates to a motorcycle incorporating the inventive fuel tank and pump assembly.

2. Background Art

Motorcycles and other saddle-type vehicles are known in which a fuel tank has a fuel pump disposed therein. Motorcycle fuel tank and fuel pump assemblies have been known in which the fuel pump is attached to the fuel tank via a ring-shaped pump support member adapted to attach in the fuel tank, such as, for example, the fuel tank and pump assembly disclosed in Japanese Patent No. 5235089.

The fuel tank and pump assembly described in Japanese Patent No. 5235089 uses, for example, a metallic plate member that has been punched into a ring shape by using outer and inner molds. This metallic member is used to form a ring-shaped fuel pump support member. With such a formation method, the material from inside the punched ring shape is discarded without being used, thus resulting in a significant waste of material. This has led to high costs associated with manufacturing such fuel pump support members.

In particular, if an expensive plate material such as titanium is used, it has been requested to enhance material usage efficiency and reduce waste.

Although the known fuel tank and fuel pump assemblies are usable for their intended purposes, a need still exists in the art for an improved fuel tank and pump assembly.

SUMMARY OF THE INVENTION

The present invention has been devised in light of the foregoing, and it is an object of the present invention to provide a fuel tank and pump assembly that can enhance material usage efficiency for the pump support member, and can thereby minimize material costs, even if an expensive material is used.

In order to achieve the above object, a first aspect of the present invention includes a fuel tank and pump assembly that supports a fuel pump with a pump support member provided on a tank outer wall of a fuel tank. The fuel pump according to the first aspect is inserted into the fuel tank from a pump attachment opening formed in the fuel tank. The pump support member is formed with a plurality of arcuate support plate elements arranged around the pump attachment opening. The fuel pump is secured to a plurality of fastening sections, each fastening section provided on one of the support plate elements, and is attached to the pump attachment opening in a liquid tight manner.

A second aspect of the invention is characterized, in addition to the configuration of the first aspect, in that the pump attachment opening is formed in a circular shape.

The second aspect of the invention is further characterized in that the support plate elements are formed in the shape of an arc, in such a manner as to have approximately the same length as one another, as seen in a top plan view.

A third aspect of the invention is characterized, in addition to the configuration of the second aspect, in that three support plate elements are arranged around the pump attachment opening.

The third aspect of the invention is further characterized in that one of the fastening sections is provided at each of the two longitudinal ends of each of the support plate elements.

A fourth aspect of the invention is characterized, in addition to the configuration of the third aspect, in that the support plate elements are arranged in a horizontally symmetrical manner with respect to a vehicle body centerline.

A fifth aspect of the invention is characterized, in addition to the configuration of any one of the first to fourth aspects, in that each of the support plate elements includes welded portions and spaced portions. Each of the welded portions is welded to the tank outer wall. Each of the spaced portions is spaced by a given distance from the tank outer wall.

The invention of the fifth aspect is further characterized in that the fastening section includes bolt male thread sections of bolts and outer support faces of the spaced portions. Each of the bolts projects toward the outside of the tank from a through-hole formed in one of the spaced portions. Bolt heads of the bolts are arranged inside of the outer support faces.

A sixth aspect of the invention is characterized, in addition to the configuration of the fifth aspect, in that each of the support plate elements has bent side walls, each of which is bent to form the spaced portion, and that each of the bent side walls engages with the bolt head to restrict rotation of the bolt.

A seventh aspect of the invention is characterized, in addition to the configuration of any one of the first to sixth aspects, in that tank alignment marks are formed in the tank outer wall. Each of the tank alignment marks identifies the position where one of the support plate elements is to be secured during machining of the tank.

The seventh aspect of the invention is further characterized in that a support plate alignment mark is formed in each of the support plate elements. The support plate alignment mark identifies the position where one of the support plate elements is to be secured.

The seventh aspect of the invention is still further characterized in that the position where each of the support plate elements is to be secured is determined based on the positional relationship between the tank alignment mark and the support plate alignment mark.

An eighth aspect of the invention is characterized, in addition to the configuration of any one of the first to seventh aspects, in that the fuel tank and the pump support member are made of a titanium alloy.

Effects of the Invention

According to the first aspect of the invention, the pump support member is formed with the plurality of arcuate support plate elements arranged around the pump attachment opening, thus downsizing the pump support member more than if a ring-shaped member surrounding the pump attachment opening is used. Further, the pump support member is formed with a plurality of members, rather than a single ring-shaped member that surrounds the pump attachment opening. Therefore, it is possible to arrange the support plate elements close to each other for cutting in such a manner as to minimize waste. This is not the case with the pump support member that is, for example, cut into a ring shape, in which case the material inside the ring shape is discarded wastefully. As a result, it is possible to minimize waste of raw material from which the pump support member is machined, thus keeping material costs low.

According to the second aspect of the invention, it is easy to arrange the support plate elements around the pump attachment opening, because the pump attachment opening is formed in a circular shape, and the support plate elements are each formed in the shape of an arc. Moreover, the support plate elements are formed to have approximately the same length as one another, as seen in a top plan view. This makes it possible to arrange target areas side by side and close to each other for cutting during formation of the support plate elements from a arcuate raw material, thus allowing the support plate elements to be formed with minimal waste and high yield.

According to the third aspect of the invention, three support plate elements are arranged around the pump attachment opening. This makes the arc shapes of the support plate elements closer to straight lines. As a result, the plate material of the support plate elements can be cut at smaller intervals during cutting of the support plate elements from a raw material, thus ensuring higher efficiency in material cutting. Further, using the three support plate elements makes these sections lengthy. In addition, the fastening section is provided at each of the two longitudinal ends of each of the support plate elements. This provides a wider interval between the fastening sections, thus contributing to improved supporting efficiency of the pump support area by making the most of the lengths of the support plate elements.

According to the fourth aspect of the invention, the support plate elements are arranged in an approximately horizontally symmetrical manner with respect to the vehicle body centerline, thus providing an excellent balance in horizontal vehicle weight.

According to the fifth aspect of the invention, each of the support plate elements includes welded portions and spaced portions. Each of the welded portions is welded to the tank outer wall. Each of the spaced portions is spaced by a given distance from the tank outer wall. Bolt male thread sections of bolts are inserted into through-holes of each of the spaced portions. Bolt heads of the bolts are located on a rear side of each of the spaced portions.

As a result, of the above arrangement of the support plate elements, each of the fastening sections includes the bolt male thread section and a outer support face of the spaced portion. This allows the fastening section to be formed with ease by arranging the bolt head on the rear side of the spaced portion and welding the support plate element to the tank outer wall.

According to the sixth aspect of the invention, each of the support plate elements has the bent side walls, each of which is bent to form the spaced portion, and each of the bent side walls engages with the bolt head to restrict the rotation of the bolt. This makes it possible to restrict the rotation of the bolts simply by providing the bolts in such a manner that each of the bolt heads is arranged on the rear side of the spaced portion.

According to the seventh aspect of the invention, the tank alignment marks are formed in the tank outer wall. The tank alignment mark identifies the position where one of the support plate elements is to be secured during machining of the tank. The support plate alignment mark is formed in each of the support plate elements. The support plate alignment mark identifies the position where one of the support plate elements is to be secured. This makes it possible to determine the position where each of the support plate elements is to be secured, for example, by aligning the tank alignment mark with the support plate alignment mark. As a result, the support plate elements can be secured with ease and accuracy, thus eliminating the need for tasks such as measurement for positioning and reducing assembly man-hours.

According to the eighth aspect of the invention, the fuel tank and the pump support member are made of titanium. This makes it possible to weld the support plate elements and minimize waste of an expensive material, thus contributing to reduced cost.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In the drawings, front, rear, left, right, top, and bottom of the vehicle are denoted respectively by "Fr," "Rr," "L," "R," "U," and "D."

First Embodiment

A description will now be given of a first embodiment of a fuel tank and pump assembly 28 installed on a motorcycle 10 according to the present invention with reference to FIGS. 1 to 7.

Figure 1:
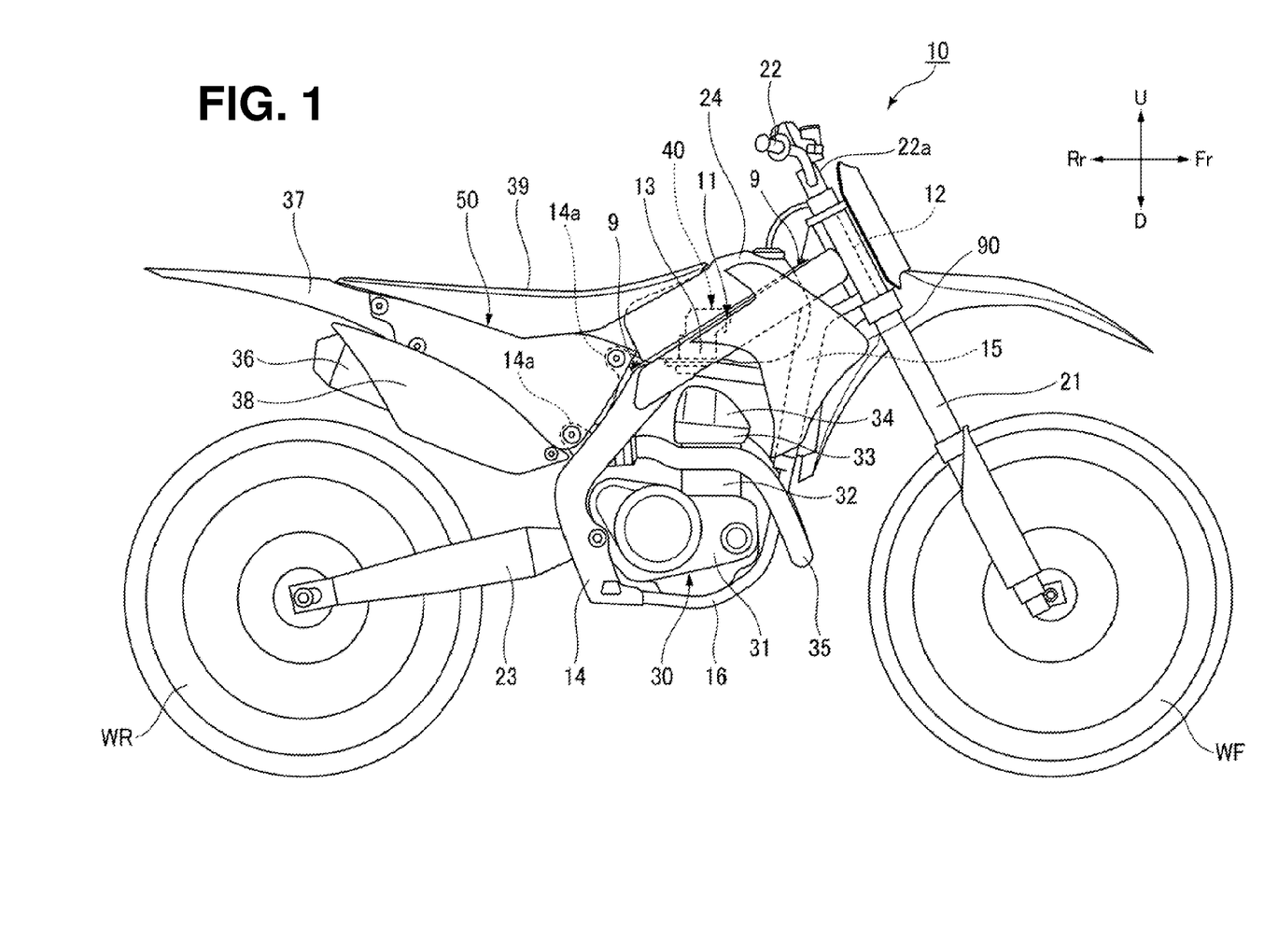
FIG. 1 is a right side view of a motorcycle to which a first embodiment of a fuel tank and pump assembly according to the present invention is applied.

A motorcycle 10 according to the present embodiment has a vehicle body frame 11 that includes a head pipe 12, a pair of left and right main frames 13, a pair of left and right pivot frames 14, a down frame 15, and a pair of left and right bottom frames 16. The head pipe 12 is provided at a front end. The left and right main frames 13 branch out to the left and right from the head pipe 12 and extend backward and downward. The left and right pivot frames 14 are connected respectively to the back ends of the left and right main frames 13, respectively, and extend downwardly therefrom. The down frame 15 extends downward from the head pipe 12. The pair of left and right bottom frames 16 connect a lower end of the down frame 15 and the lower ends of the pair of left and right pivot frames 14. An engine 30 is attached to the pivot frames 14 and also to the bottom frames 16.

Further, the motorcycle 10 includes a front fork 21, a front wheel WF, a steering handlebar 22, a swing arm 23 pivotally attached to the pivot frames 14, a rear wheel WR, a rear wheel suspension which is not shown, and a fuel tank 24 which is operatively mounted on the vehicle body frame 11. The front fork 21 is supported by the head pipe 12 in a pivotally steerable manner. The front wheel WF is rotatably supported by a lower end of the front fork 21. The steering handlebar 22 is attached to a steering rod 22a at an upper end of the front fork 21. The swing arm 23 is supported by the pivot frames 14 in a freely swingable manner. The rear wheel WF is rotatably supported at a rear end of the swing arm 23. The rear wheel suspension is attached to an upper portion of the swing arm 23.

As seen in FIG. 1, the fuel tank is disposed between the main frames 13 of the vehicle body frame 11, and is substantially aligned with a longitudinal center line of the vehicle body frame. The fuel tank 24 is operatively attached to the main frames 13, and includes a main tank body 24t which is provided as a hollow housing. A removable cap 24c is provided on the main tank body 24t to permit fuel to be added to the fuel tank 24 in conventional fashion.

Further, a rear seat support frame 50 is bolted to the left and right pivot frames 14. A rear fender 37, a muffler cover 38, and a passenger seat 39 are secured to the rear seat support frame 50.

The outer shell of the engine 30 primarily includes a crankcase 31, a cylinder block 32, a cylinder head 33, and a cylinder head cover 34 as illustrated in FIG. 1. The cylinder block 32 is attached to a front upper end of the crankcase 31. The cylinder head 33 is attached to an upper end of the cylinder block 32. The cylinder head cover 34 covers an upper opening of the cylinder head 33.

A throttle body and an air cleaner case that are not shown are connected to the cylinder head 33. Further, an exhaust pipe 35 and a muffler 36 are connected to the cylinder head 33. The muffler 36 is attached to a downstream end of the exhaust pipe 35 to reduce exhaust sound.

Further, two pair of left and right attachment brackets 14a are formed, one at an upper end of the pair of left and right pivot frames 14 and another on an intermediate rear face thereof, as illustrated in FIG. 1. The rear seat support frame 50 is fastened to an outer face of these four attachment brackets 14a, one each at top left, top right, bottom left, and bottom right, in the direction of the vehicle width. Still further, the rear fender 37 and the muffler cover 38 are attached to a rear end of the rear seat support frame 50 as appropriate. Still further, a cover member 90 is provided to cover part of the lateral area of a radiator 17 and the front lateral area of the fuel tank 24.

Figure 2:
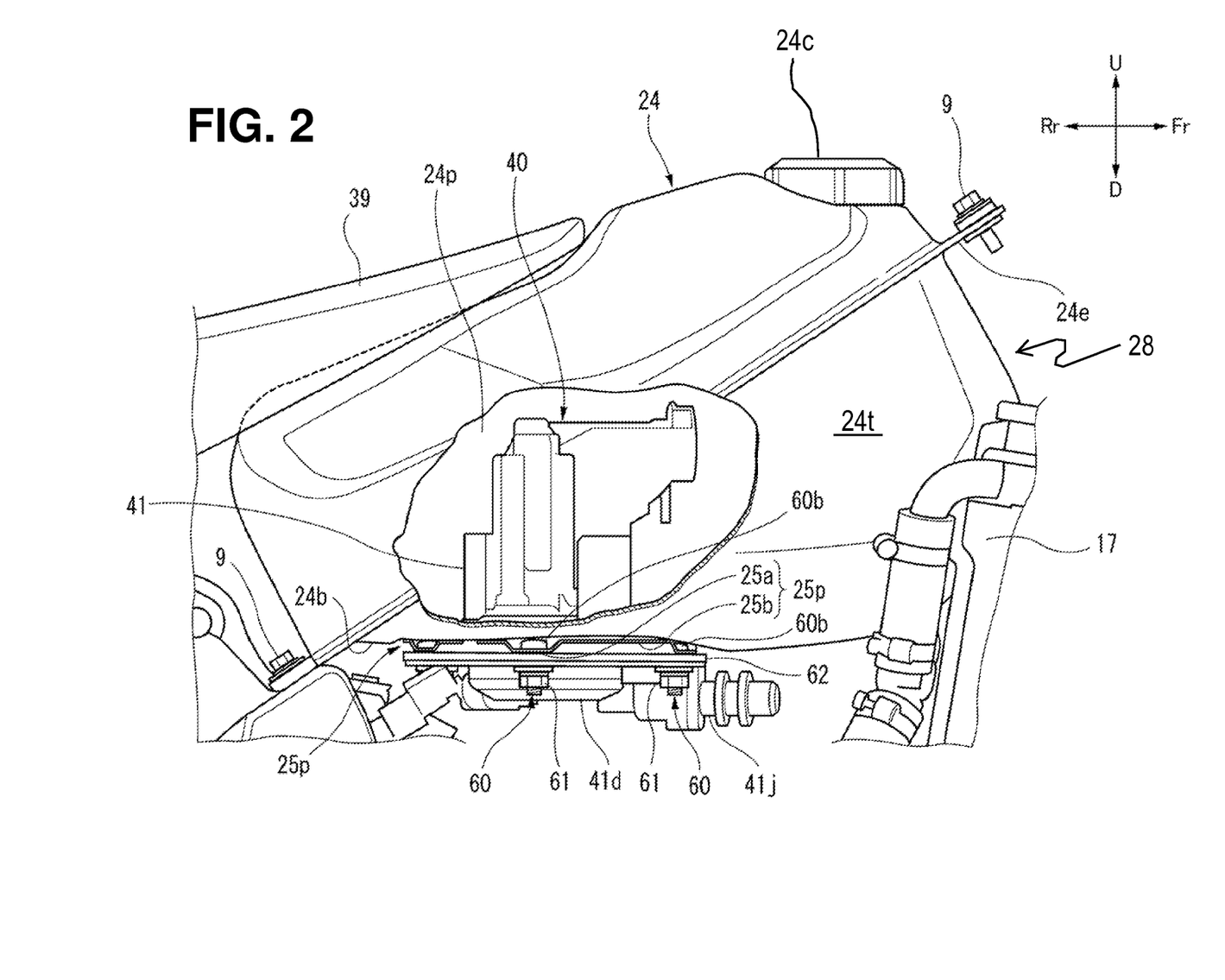
FIG. 2 is an enlarged side detail view of the motorcycle of FIG. 1, with part of a fuel tank shown broken away for illustrative purposes.
Figure 3:
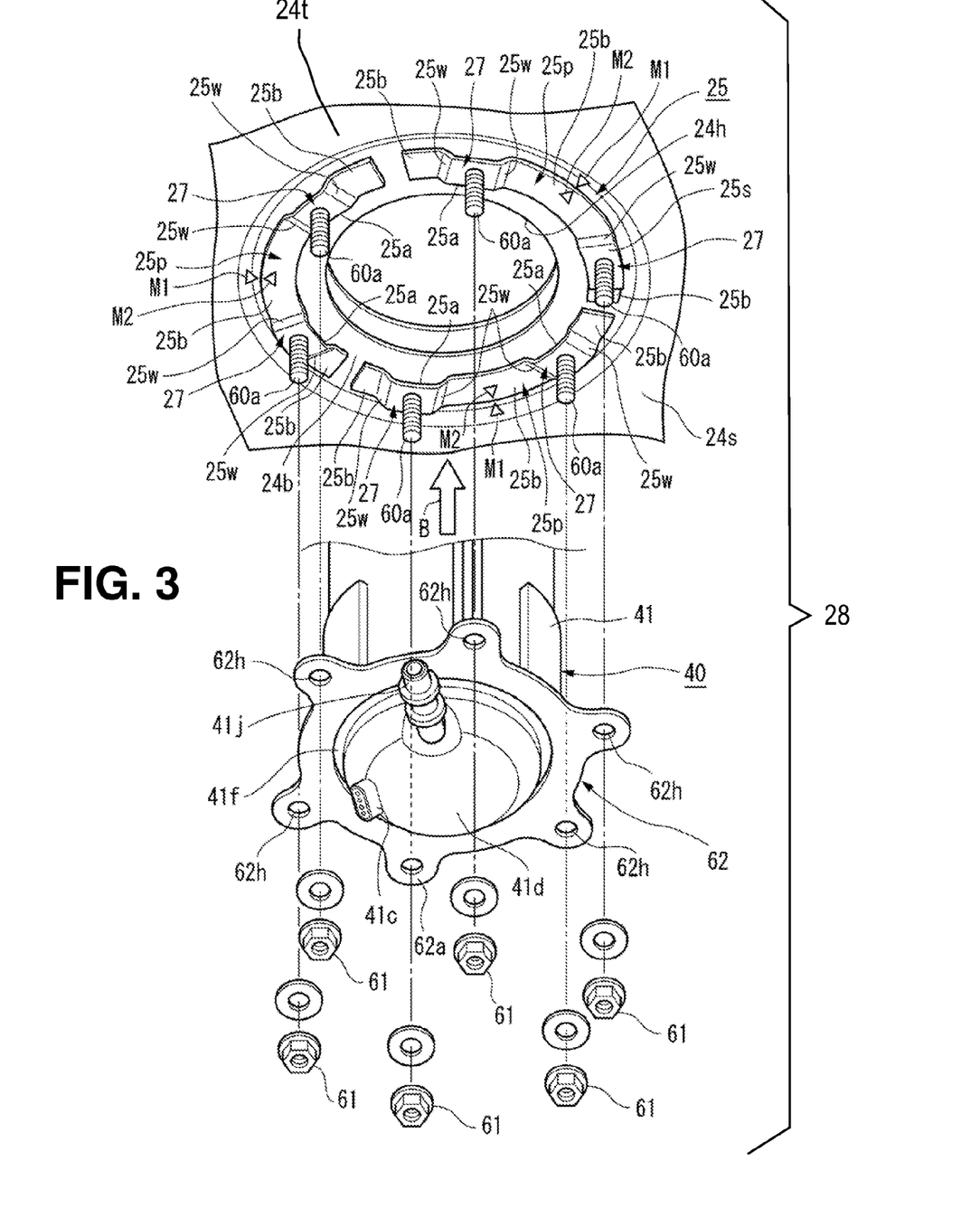
FIG. 3 is an exploded perspective detail view showing major components of the fuel tank and pump assembly for the motorcycle illustrated in FIG. 1.

Still further, a fuel pump 40 is provided in the fuel tank 24 to supply fuel from the tank to the throttle body, as illustrated in FIGS. 1 and 2. The fuel tank 24 and fuel pump 40 cooperate to form a fuel tanks and fuel pump assembly 28 (FIG. 3). The fuel pump 40 is installed in such a manner as to be at least partially inserted into the fuel tank 24 through a pump attachment opening 24h (refer to FIG. 3) formed on a bottom face 24b of the fuel tank 24.

The fuel pump 40 is provided in such a manner that when installed in and attached to the fuel tank 24, a pump main body 41 extends upright in a tank inner space 24p formed inside of the main tank body 24t, and a pump bottom section 41d projects downwardly below the fuel tank 24.

A further detailed description will be given below of the fuel tank and pump assembly 28 and the manner in which the pump is attached, with reference to FIGS. 2 and 3.

The pump main body 41 of the fuel pump 40 is inserted into the tank inner space 24p through the pump attachment opening 24h, and the pump bottom section 41d is secured to the main tank body 24t as illustrated in FIG. 3. At this time, the fuel pump 40 is held by a pump support member 25 provided near the pump attachment opening 24h, as will be described later.

Here, the pump support member 25 provided near the pump attachment opening 24h is formed with a plurality (three in the depicted example) of arcuate support plate elements 25p provided on a tank outer wall 24s. The arcuate support plate elements 25p are bent, as appropriate, in order to accommodate bolt heads, as will be described later. Further, the pump attachment opening 24h is formed in a circular shape, and the three support plate elements 25p are provided equidistantly in such a manner as to substantially surround the pump attachment opening 24h. Still further, each of the three support plate elements 25p, respectively, is formed in the shape of an arc, in such a manner as to have approximately the same length as the other support plate elements, as seen in top plan view.

It should be noted that the bottom face 24b of the fuel tank 24 in which the pump attachment opening 24h is formed is pressed inwardly toward the inside of the tank more than other bottom faces of the fuel tank 24 to form an annular flat surface. This not only forms a flat tank outer face for easy installation of the pump support member 25, but also reduces the extent to which bolt male thread sections 60a of fastening sections 27 project downwardly.

Further, the fastening sections 27 are provided at two positions of each of the support plate elements 25p. The bolt male thread section 60a projects downward from each of the fastening sections 27. The fastening section 27 is located near each of the two longitudinal ends of each of the support plate elements 25p, thus providing a wide interval between the fastening sections 27.

Further, the support plate elements 25p are bent in the direction of plate thickness. That is, each of the support plate elements 25p includes three welded portions 25b and two spaced portions 25a. Each of the welded portions 25b is welded to the tank outer wall 24s. Each of the spaced portions 25a is spaced downwardly away from the tank outer wall 24s, because of a bent side wall 25w that extends outwardly by a given distance from the tank outer wall 24s.

A through-hole 26 is formed in each of the spaced portions 25a. The bolt male thread section 60a of a respective bolt 60 is penetrated through each of the through-holes 26. Then, each of the support plate elements 25p holds bolt heads 60b between the tank outer wall 24s and the spaced portions 25a. Therefore, each of the fastening sections 27 includes the bolt male thread section 60a and a outer support face 25s of the spaced portion 25a.

It should be noted that, in the present embodiment, each of the bolts 60 is secured in the through-hole 26, for example, by swaging the bolt head 60b. Thus, if the bolt 60 is secured to the support plate member 25p by swaging, the fastening section 27 can be formed by welding the welded portion 25b to the tank outer wall 24s.

An attachment flange section 41f (refer to FIGS. 3-4) is provided on the pump bottom section 41d of the fuel tank 40. The attachment flange section 41f faces the bottom face 24b of a peripheral edge of the pump attachment opening 24h. Therefore, when the fuel pump 40 is attached, the pump main body 41 is inserted through the pump attachment opening 24h (in the direction indicated by arrow B in FIG. 3) as illustrated in FIG. 3.

Figure 4:
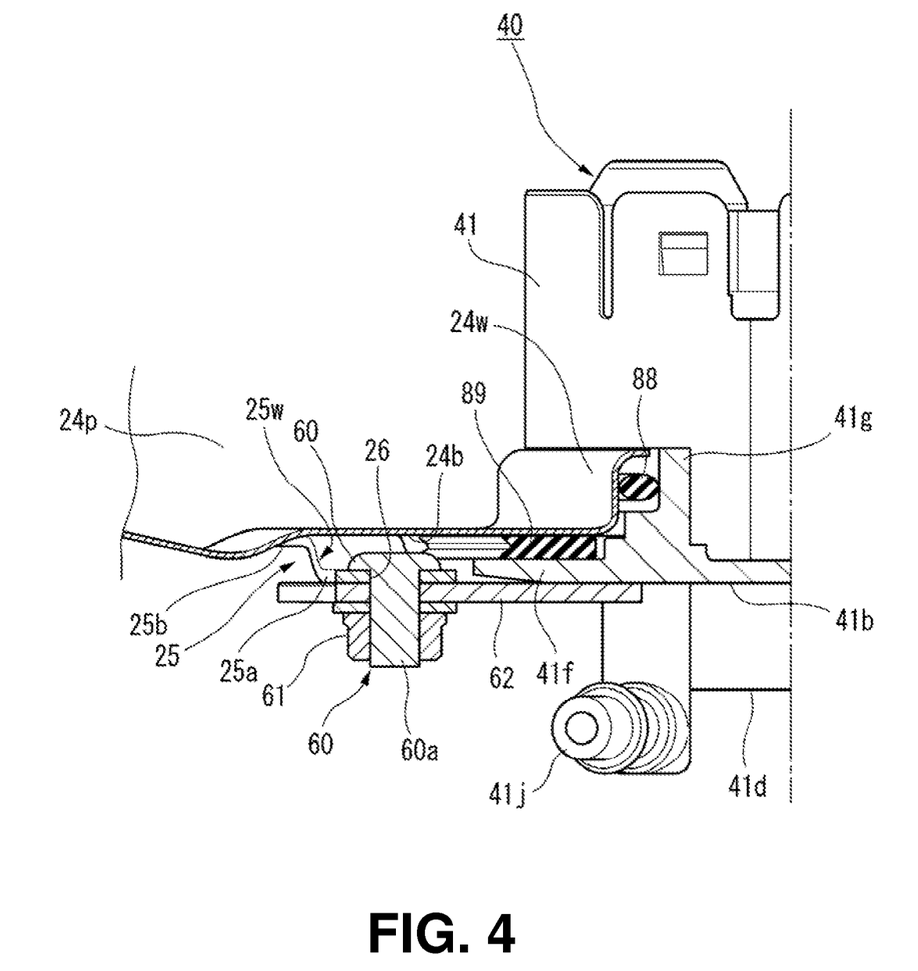
FIG. 4 is a cross-sectional view of the major components of the fuel tank and pump assembly of FIG. 3.

Then, a set ring 62 of the fuel pump 24, disposed adjacent the attachment flange section 41f, is attached to the fastening section 27. The set ring 62 is, for example, a ring-shaped plate having through-holes 62h formed therein for receiving the six bolt male thread sections 60a. Nuts 61 are tightened in such a manner as to bring the set ring 62 into contact with the outer support faces 25s of the spaced portions 25a. This tightening secures and attaches the fuel pump 40 to the fuel tank 24. It should be noted that a joint section 41j and a connector section 41c are provided on the pump bottom section 41d of the fuel pump 40. The joint section 41j is connected to a fuel pipe which is not shown. The connector section 41c is used to supply drive power via an electrical connection to a power source (not shown).

Further, a first gasket 88 is arranged between a main body outer perimeter section 41g of the fuel pump 40 that has been secured and attached and an inner perimeter wall section 24w of the pump attachment opening 24h as illustrated in FIG. 4. The first gasket 88 is used for sealing in the direction of diameter of the pump attachment opening 24h. Still further, a second gasket 89 is arranged between the attachment flange section 41f and the bottom face 24b of the fuel tank 24. The second gasket 89 is used for sealing in the direction of the bottom face 24b. Therefore, the fuel pump 40 is attached to the pump attachment opening 24h in a liquid tight manner using a double sealing structure.

Still further, the fuel tank 24 and the support plate elements 25p of the pump support member 25 according to the present embodiment are each respectively made of a titanium alloy. The fact that the fuel tank 24 and the support plate elements 25p that are attached to the upper areas of the main frames 13 are made of a titanium alloy contributes to a lighter vehicle with a lower center of gravity.

Figure 5:
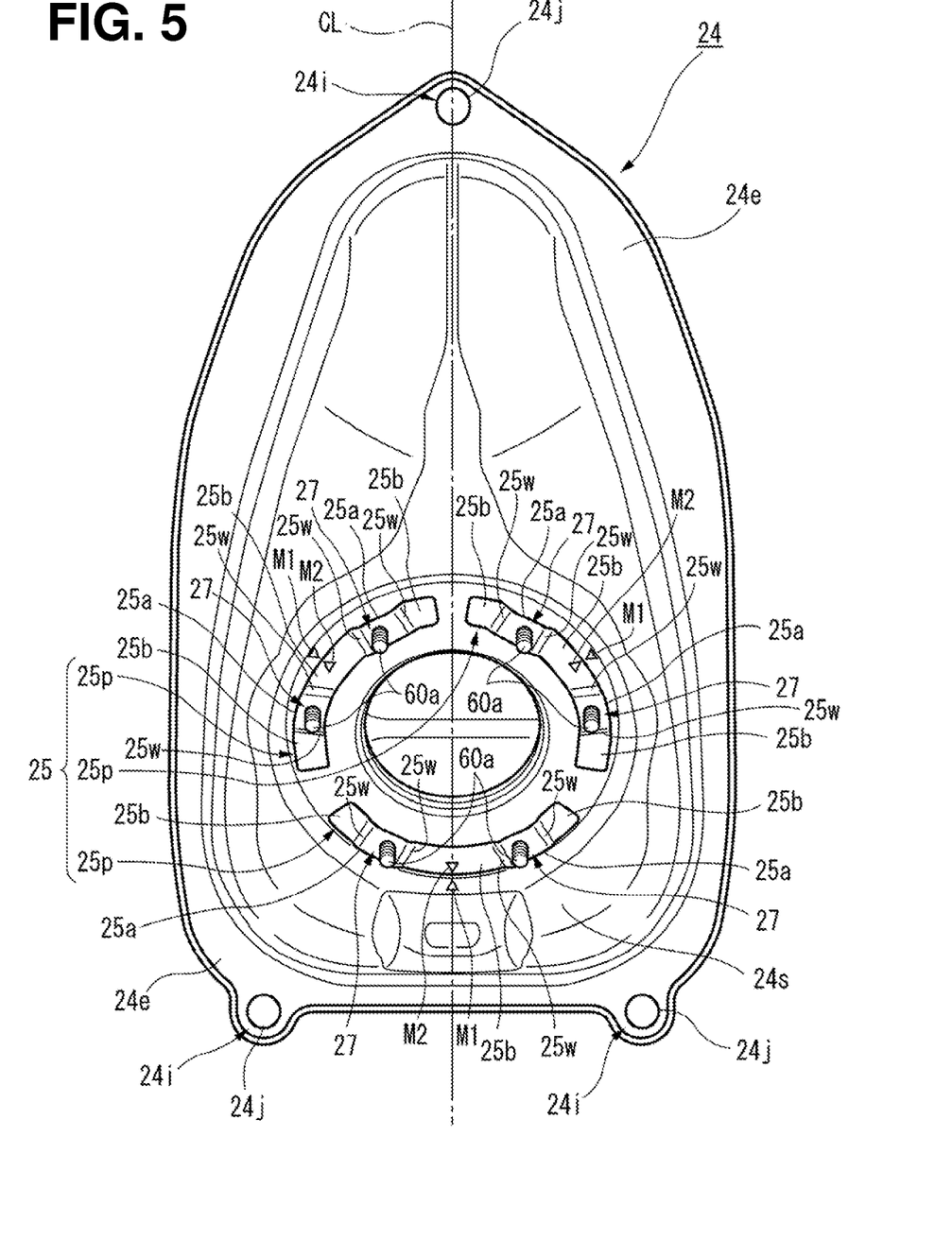
FIG. 5 is a bottom plan view of the fuel tank of FIGS. 1-2, shown before the fuel pump is attached thereto.

Still further, the main tank body 24t of the fuel tank 24 is formed, for example, by welding upper and lower substantially concave shell parts together at a joint edge section 24e between outer perimeters thereof. Therefore, the joint edge section 24e is formed at an approximately intermediate area in the vertical direction of the fuel tank 24 (refer to FIG. 2) in such a manner as to project horizontally outwardly. The joint edge section 24e has three attachment holes as illustrated in FIG. 5, an attachment hole 24j provided in an attachment section 24i at the front end of the tank (top in FIG. 5) and the two attachment holes 24j each of which is provided in the left or right attachment section 24i at the rear area of the tank (bottom in FIG. 5). The joint edge section 24e is secured as appropriate to the vehicle body frame 11 via tank attachment screws 9.

Still further, as seen best in FIG. 5, the two support plate elements 25p close to the vehicle front are arranged in a horizontally symmetrical manner with respect to a vehicle body centerline CL, and the one support plate member 25p on the rear of the vehicle is arranged in such a manner that the vehicle body centerline CL passes through a central portion of this support plate member 25p, as illustrated in FIG. 5. Therefore, the support plate elements 25p are horizontally balanced in weight.

Figure 6A:
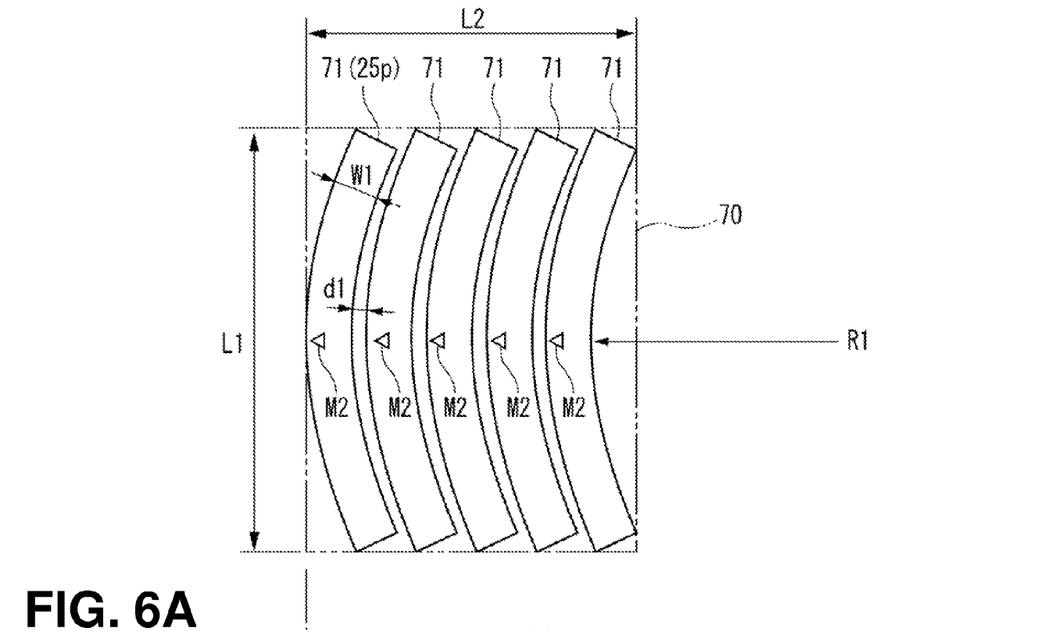
FIGS. 6A and 6B are a schematic top plan views of raw material marked for describing the machining process of support plate elements of the fuel tank and pump assembly according to the present invention.
Figure 6B:
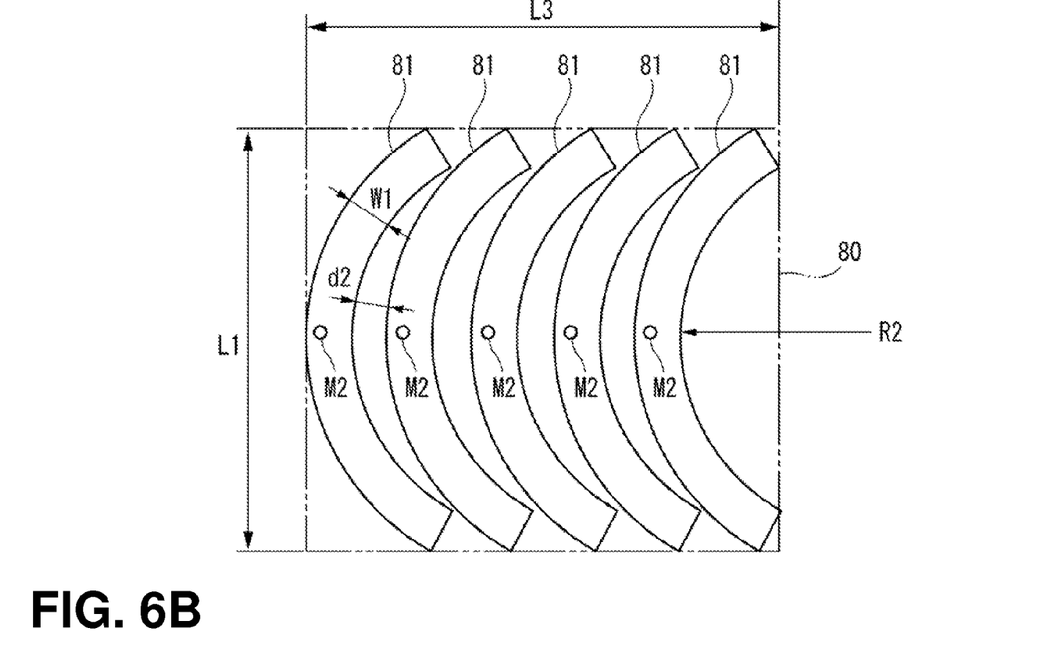

The support plate elements 25p, each formed in the shape of an arc according to the present embodiment can be manufactured, for example, by cutting them out from a arcuate raw material. That is, as illustrated in FIGS. 6(a) and 6(b), plate materials 71 and 81 of the support plate elements 25p having a given width W1 are cut respectively from given rectangular (length L1 and width L2 or L3) raw materials 70 and 80. At this time, the plate materials 71 and 81 are cut respectively at small intervals d1 and d2. The cutting intervals d1 and d2 can be reduced to significantly smaller values than if ring-shaped support plate elements are cut.

Further, setting a curvature R1 of the arcs of the support plate elements 25p illustrated in FIG. 6(a) larger than a curvature of the arcs illustrated in FIG. 6(b) makes the cutting interval d1 smaller than the cutting interval d2.

Still further, in the present embodiment, three tank alignment marks M1, for example, in the shape of a triangle are formed equidistantly in the circumferential direction in the tank outer wall 24s as illustrated in FIGS. 3 and 5. Each of the tank alignment marks M1 identifies the position where one of the support plate elements 25p is to be secured during machining of the tank, for example, during press working. On the other hand, a support plate alignment mark M2, for example, in the shape of a triangle is formed at a longitudinal intermediate position of each of the support plate elements 25p as illustrated in FIG. 6(a). The support plate alignment mark M2 identifies the position where the support plate member 25p is to be secured.

This makes it possible to determine, with ease, the position where one of the three support plate elements 25p is to welded, for example, by aligning the tank alignment mark M1 with the support plate alignment mark M2.

It should be noted that the support plate alignment marks M2 illustrated in FIG. 6(b) are shown in other shape such as circle.

As described above, according to the fuel tank and pump assembly of the present embodiment, the pump support member 25 is formed with the plurality of arcuate support plate elements 25p arranged around the pump attachment opening 24h, thus downsizing the pump support member 25 more than if a ring-shaped member surrounding the pump attachment opening 24h is used. Further, the pump support member 25 is formed with a plurality of members rather than a single ring-shaped member that surrounds the pump attachment opening 24h. Therefore, it is possible to arrange the plate materials 71 and 81 (support plate elements 25p) close to each other for cutting in such a manner as to minimize waste as illustrated in FIG. 6. This is not the case with the pump support member 25 that is, for example, cut into a ring shape, in which case the material inside the ring shape is discarded wastefully. This minimizes waste of the raw materials 70 and 80 from which the pump support member 25 is machined, thus contributing to reduced cost.

Further, according to the fuel tank and pump assembly of the present embodiment, the support plate elements 25p are formed in the shape of an arc in such a manner as to have approximately the same length as seen in plan view as illustrated in FIG. 6. As a result, because the support plate elements 25p are formed in the shape of an arc for the circular pump attachment opening 24h, it is easy to arrange the support plate elements 25p around the pump attachment opening 24h. Moreover, the support plate elements 25p are formed in such a manner as to have approximately the same length as seen in plan view. This makes it possible to arrange target areas side by side and close to each other for cutting during formation of the support plate elements 25p from the arcuate raw materials 70 and 80, thus allowing the support plate elements 25p to be formed with minimal waste and high yield.

Still further, according to the fuel tank and pump assembly of the present embodiment, the three support plate elements 25p are arranged in such a manner as to surround the pump attachment opening 24h. This makes the arc shapes of the support plate elements 25p closer to straight lines. As a result, the plate materials 71 and 81 of the support plate elements 25p can be cut at smaller intervals during cutting of the support plate elements 25p from the raw materials 70 and 80 as illustrated in FIG. 6, thus ensuring higher efficiency in material cutting. Still further, using the three support plate elements 25p makes these sections lengthy. In addition, the fastening section 27 is provided at each of the two longitudinal ends of each of the support plate elements 25p. This provides a wider interval between the fastening sections 27, thus contributing to improved supporting efficiency of the pump support area by making the most of the lengths of the support plate elements 25p.

Still further, according to the fuel tank and pump assembly of the present embodiment, the support plate elements 25p are arranged in an approximately horizontally symmetrical manner with respect to the vehicle body centerline CL, thus providing an excellent balance in horizontal vehicle weight.

Still further, according to the fuel tank and pump assembly of the present embodiment, each of the support plate elements 25p includes welded portions 25b and spaced portions 25a. Each of the welded portions 25b is welded to the tank outer wall 24s. Each of the spaced portions 25a is spaced by a given distance from the tank outer wall 24s. The bolt male thread sections 60a of the bolts 60 are inserted into the through-holes 26 of each of the spaced portions 25a. The bolt heads 60b are located on the rear side of each of the spaced portions 25a. As a result, each of the fastening sections 27 includes the bolt male thread section 60a and the outer support face 25s of the spaced portion 25a. This allows the fastening section 27 to be formed with ease by arranging the bolt head 60b on the rear side of the spaced portion 25a and welding the support plate member 25p to the tank outer wall 24s.

Still further, according to the fuel tank and pump assembly of the present embodiment, the tank alignment marks M1 are formed in the tank outer wall 24s. The tank alignment mark M1 identifies the position where one of the support plate elements 25p is to be secured during machining of the tank. The support plate alignment mark M2 is formed in each of the support plate elements 25p. The support plate alignment mark M2 identifies the position where one of the support plate elements 25p is to be secured. This makes it possible to determine the position where each of the support plate elements 25p is to be secured, for example, by aligning the tank alignment mark M1 with the support plate alignment mark M2. As a result, the support plate elements 25p can be secured with ease and accuracy, thus eliminating the need for tasks such as measurement for positioning and reducing assembly man-hours.

Still further, according to the fuel tank and pump assembly of the present embodiment, the fuel tank 24 and the support plate elements 25p of the pump support member 25 are made of titanium alloy. This makes it possible to weld the support plate elements 25p and minimize waste of an expensive material such as titanium alloy, thus contributing to reduced cost.

Figure 7:
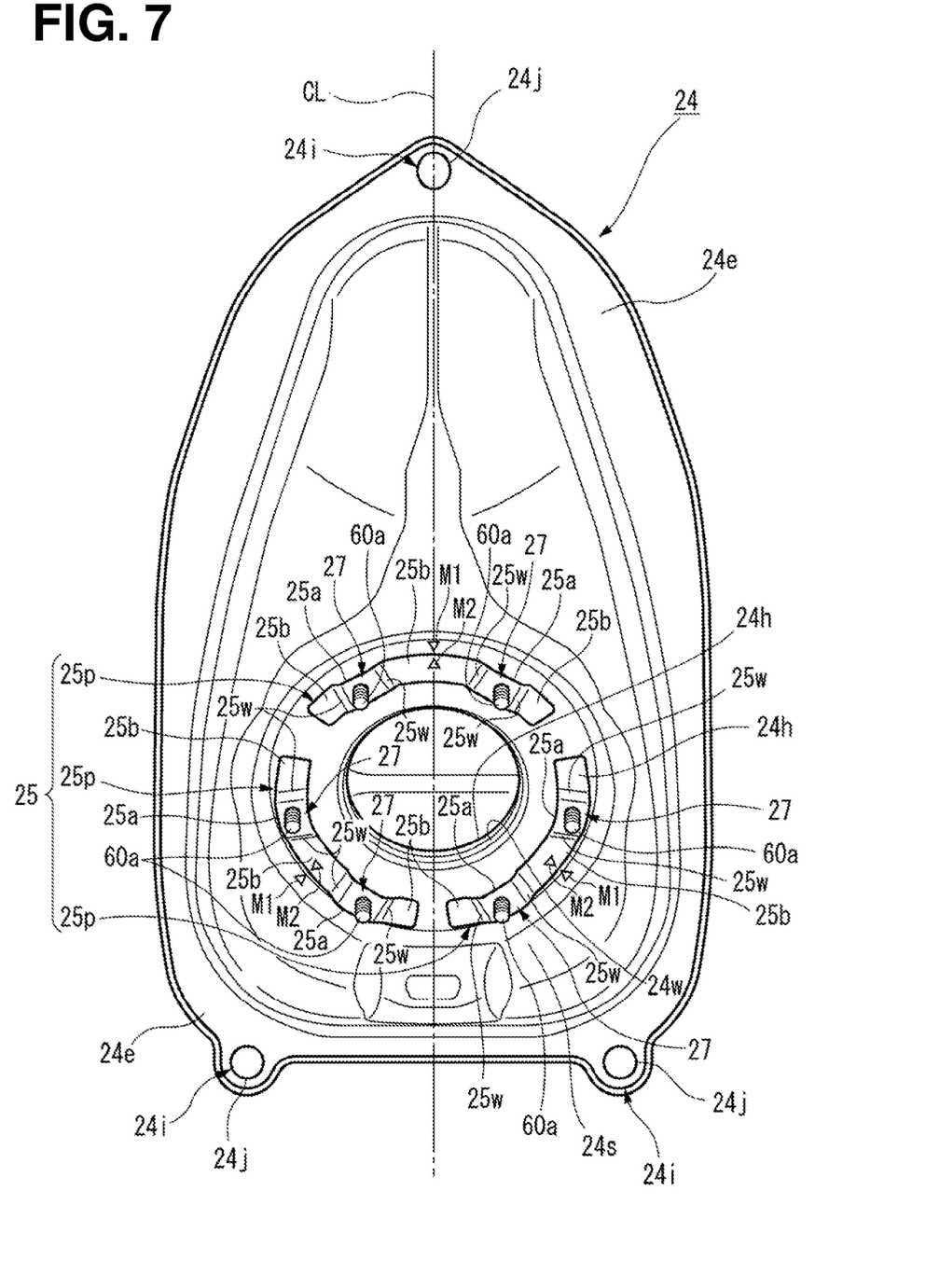
FIG. 7 is a bottom view of the fuel tank similar to FIG. 5, illustrating a modified example of the first embodiment of the fuel tank and pump assembly according to a second embodiment of the present invention.

Still further, the support plate elements 25p may be arranged as illustrated in FIG. 7 as a modification example of the present embodiment. In this case, the two support plate elements 25p close to the vehicle rear are arranged in the horizontally symmetrical manner with respect to the vehicle body centerline CL, and the one support plate member 25p on the front of the vehicle is arranged in such a manner that the vehicle body centerline CL passes this support plate member 25p. In this case, the support plate elements 25p are also arranged in the approximately horizontally symmetrical manner with respect to the vehicle body centerline CL, thus providing an excellent balance in horizontal vehicle weight.

It will be understood from the foregoing description that the present invention also encompasses a motorcycle 10 incorporating the described fuel tank and pump assembly.

Second Embodiment

A description will be given next of a second embodiment of the fuel tank and pump assembly according to the present embodiment with reference to FIGS. 8 and 9. It should be noted that the same or like components to those in the first embodiment are denoted by the same reference symbols in the drawings, and that the description thereof is omitted or simplified.

Figure 8:
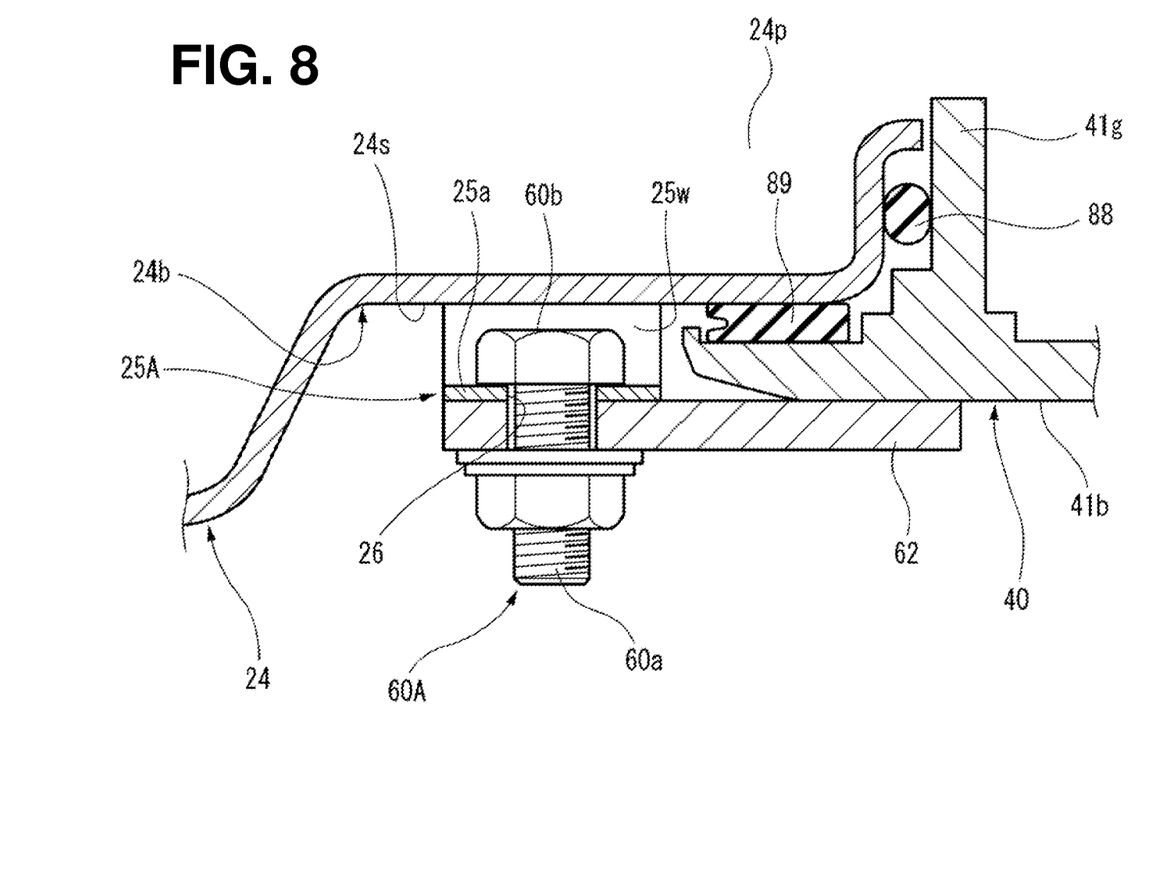
FIG. 8 is a cross-sectional view of major components in a second embodiment of the fuel tank and pump assembly according to the present invention.
Figure 9:
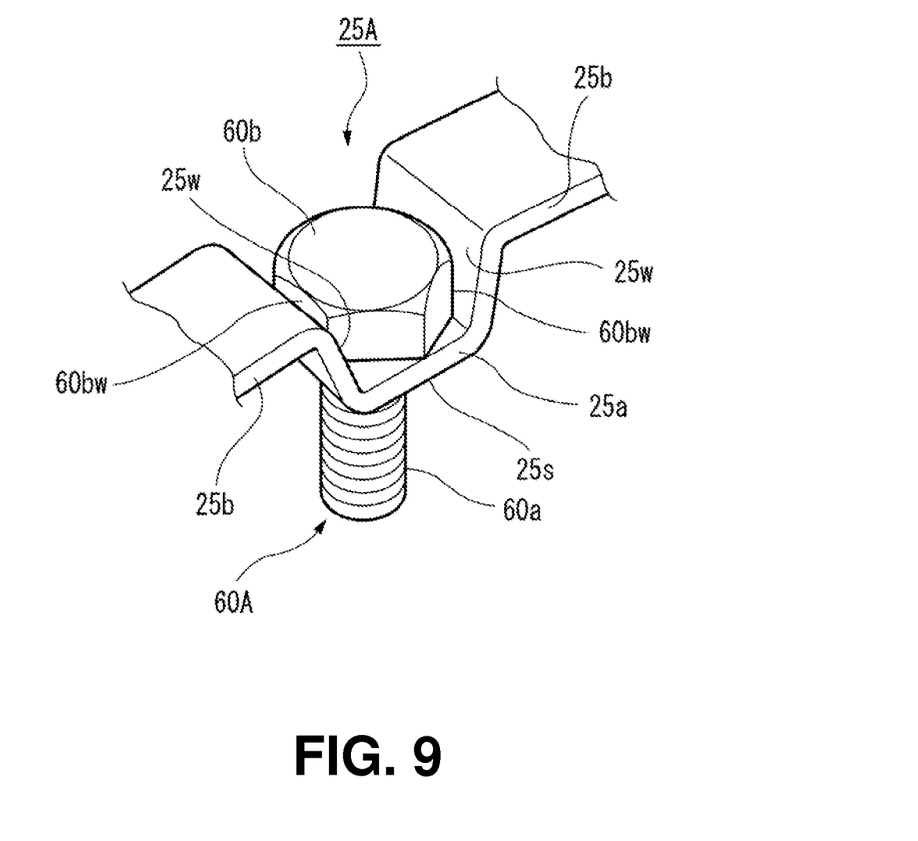
FIG. 9 is a perspective view of major components of a pump support member which is one component of the assembly illustrated in FIG. 8.

In the present embodiment, the securing structure of a bolt 60A may be different from that in the first embodiment as illustrated in FIGS. 8 and 9. A pump support member 25A in this case has the three support plate elements 25p as in the first embodiment. Each of the support plate elements 25p has the welded portions 25b and the spaced portions 25a. Each of the welded portions 25b is welded to the tank outer wall 24s. Each of the spaced portions 25a is spaced from the tank outer wall 24s by a given distance. The bolt male thread section 60a of the bolt 60A is penetrated through each of the through-holes 26 of the spaced portions 25a.

It should be noted that the bolt head 60b in the present embodiment is hexagonal in shape unlike the bolt head 60b in the first embodiment. Then, the bolt head 60b is only located on the rear side of the spaced portions 25a. The bolt 60A is not secured by swaging as in the first embodiment. That is, the bolt head 60b is arranged on the rear side of the spaced portion 25a. Side faces 60bw of the bolt head 60b engage with the bent side wall 25w that is bent to form the spaced portion 25a so as to restrict a rotation of the bolt 60A.

As described above, according to the fuel tank and pump assembly of the present embodiment, the bent side wall 25w that is bent to form the spaced portion 25a engages with the bolt head 60b to restrict the rotation of the bolt 60A. Therefore, it is possible to restrict the rotation of the bolt 60A simply by providing the bolt 60A in such a manner that the bolt head 60b is arranged on the rear side of the spaced portion 25a.

Other configuration and effects are the same as those in the first embodiment.

Thus, the present invention is not limited to the embodiments described above and may be modified as appropriate within the spirit and scope of the present invention.

As for the support plate elements 25p of the pump support member 25 in the fuel tank and pump assembly, for example, the number of the support plate elements 25p is not limited to three as in the above embodiments. The pump support member 25 may include the three or more support plate elements 25p.

Further, the support plate elements 25p in the above embodiments are in the shape of an arc as seen in plan view. However, the shape of the support plate elements 25p is not limited thereto. Instead, the support plate elements 25p may be bent as appropriate in such a manner as to surround the pump attachment opening 24h. Alternatively, the support plate elements 25p may be linear in shape. Still further, the number of the fastening sections 27 provided on each of the support plate elements 25p is not limited to two. Instead, the single fastening section 27 or the three or more fastening sections 27 may be provided.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS

10 Motorcycle
11 Vehicle body frame
24 Fuel tank
24h Pump attachment opening
24s Tank outer wall
25 Pump support member
25a Spaced portion
25b Welded portion
25p Support plate element
25s Outer support face
26 Through-hole
27 Fastening section
40 Fuel pump
60, 60A Bolt
60a Bolt male thread section
60b Bolt head
CL Vehicle body centerline
M1 Tank alignment mark
M2 Support plate alignment mark

What is claimed is:

1. A fuel tank and pump assembly, comprising:
a fuel tank comprising a hollow tank body having a tank outer wall and having a pump attachment opening formed therein, wherein the pump attachment opening is formed in a circular shape;
a pump support member provided on and attached to the tank outer wall of the tank body;
a fuel pump at least partially inserted into the fuel tank via the pump attachment opening, wherein:
the pump support member comprises three arcuate support plate elements which are arranged around the pump attachment opening, each of the support plate elements comprising at least one fastening section,
the fuel pump is operatively attached to the fastening sections, and is connected to the pump attachment opening in a liquid tight manner;
the support plate elements are formed in the shape of an arc and configured in such a manner as to have approximately the same length as one another; and
each support plate element comprises two fastening sections, with one of said fastening sections provided adjacent each end thereof.

2. The fuel tank and pump assembly of claim 1, wherein the support plate elements are arranged in a horizontally symmetrical manner with respect to a longitudinal center line of the fuel tank.

3. The fuel tank and pump assembly of claim 1, wherein the fuel tank and the pump support member are made of a titanium alloy.

4. The fuel tank and pump assembly of claim 1, wherein the fuel pump comprises two separate annular sealing members.

5. A fuel tank and pump assembly, comprising:
a fuel tank comprising a hollow tank body having a tank outer wall and having a pump attachment opening formed therein;
a pump support member provided on and attached to the tank outer wall of the tank body;
a fuel pump at least partially inserted into the fuel tank via the pump attachment opening, wherein:
the pump support member comprises a plurality of arcuate support plate elements arranged around the pump attachment opening, each of the support plate elements comprising at least one fastening section, and
the fuel pump is operatively attached to the fastening sections, and is connected to the pump attachment opening in a liquid tight manner;
wherein each of the support plate elements comprises:
a plurality of welded portions, each of which is welded to the tank outer wall, and
a plurality of spaced portions, each of which is spaced away from the tank outer wall by a given distance, each of the spaced portions having a through hole formed therein;
wherein each of the fastening sections comprises a bolt having a shaft comprising
a male threaded section which projects outwardly away from the tank and which passes through the through-hole formed in one of the spaced portions,
and a bolt head disposed inside one of the spaced portions;
and wherein each of the support plate elements has bent side walls, each of which is bent to form the spaced portion, and each of the bent side walls engages with the bolt head to restrict rotation of the bolt.

6. A fuel tank and pump assembly, comprising:
a fuel tank comprising a hollow tank body having a tank outer wall and having a pump attachment opening formed therein;
a pump support member provided on and attached to the tank outer wall of the tank body;
a fuel pump at least partially inserted into the fuel tank via the pump attachment opening, wherein:
the pump support member comprises a plurality of arcuate support plate elements arranged around the pump attachment opening, each of the support plate elements comprising at least one fastening section, and
the fuel pump is operatively attached to the fastening sections, and is connected to the pump attachment opening in a liquid tight manner;
a plurality of tank alignment marks are provided on the tank outer wall to identify positions where one of the respective support plate elements is to be secured during assembly of the tank,
a support plate alignment mark is formed on each of the support plate elements to cooperate with one of the tank side alignment marks to identify a position where one of the support plate elements is to be secured during assembly of the tank, and
the position where each of the support plate elements is to be secured is determined based on a positional relationship between one of said tank alignment marks and a corresponding support plate alignment mark.

7. A motorcycle comprising:
a vehicle body frame, a fuel tank operatively mounted on said vehicle body frame, said fuel tank comprising a hollow tank body having a tank outer wall and having a pump attachment opening formed therein and having a circular shape;

a pump support member provided on and attached to the tank outer wall of the tank body;

a fuel pump at least partially inserted into the fuel tank via the pump attachment opening, wherein:

the pump support member comprises three arcuate support plate elements which are arranged around the pump attachment opening, each of the support plate elements comprising at least one fastening section, the fuel pump is operatively attached to the fastening sections, and is connected to the pump attachment opening in a liquid tight manner;

the support plate elements are formed in the shape of an arc and configured in such a manner as to have approximately the same length as one another; and each support plate element comprises two fastening sections, with one of said fastening sections provided adjacent each end thereof.

8. The motorcycle of claim 7, wherein the fuel tank is disposed between a pair of left and right main frames of the vehicle body frame, and is substantially aligned with a longitudinal center line of the vehicle body frame.

9. The motorcycle of claim 7, wherein the support plate elements are arranged in a horizontally symmetrical manner with respect to a longitudinal center line of the fuel tank.

10. The motorcycle of claim 7, wherein each of the support plate elements comprises:

a plurality of welded portions, each of which is welded to the tank outer wall, and a plurality of spaced portions, each of which is spaced away from the tank outer wall by a given distance, each of the spaced portions having a through hole formed therein;

and wherein each of the fastening sections comprises a bolt having a shaft comprising a male threaded section which projects outwardly away from the tank and which passes through the through-hole formed in one of the spaced portions, and a bolt head disposed inside one of the spaced portions.

11. The motorcycle of claim 10, wherein:

each of the support plate elements has bent side walls, each of which is bent to form the spaced portion, and each of the bent side walls engages with the bolt head to restrict rotation of the bolt.

12. The motorcycle of claim 7, wherein the fuel tank and the pump support member are made of a titanium alloy.

13. The motorcycle of claim 7, wherein the fuel pump comprises two separate annular sealing members.

14. A motorcycle, comprising:

a vehicle body frame, a fuel tank operatively mounted on said vehicle body frame, said fuel tank comprising a hollow tank body having a tank outer wall and having a pump attachment opening formed therein;

a pump support member provided on and attached to the tank outer wall of the tank body;

a fuel pump at least partially inserted into the fuel tank via the pump attachment opening, wherein:

the pump support member comprises a plurality of arcuate support plate elements arranged around the pump attachment opening, each of the support plate elements comprising at least one fastening section, the fuel pump is operatively attached to the fastening sections, and is connected to the pump attachment opening in a liquid tight manner, a plurality of tank alignment marks are provided on the tank outer wall to identify positions where one of the respective support plate elements is to be secured during assembly of the tank, a support plate alignment mark is formed on each of the support plate elements to cooperate with one of the tank side alignment marks to identify a position where one of the support plate elements is to be secured during assembly of the tank, and the position where each of the support plate elements is to be secured is determined based on a positional relationship between one of said tank alignment marks and a corresponding support plate alignment mark.

* * * * *